United States Patent [19]
Imai

[11] Patent Number: 5,120,355
[45] Date of Patent: Jun. 9, 1992

[54] WATER-REPELLENT COMPOSITION

[75] Inventor: Nobuo Imai, Hiratsuka, Japan

[73] Assignee: Nippon Oil Co., Ltd., Japan

[21] Appl. No.: 680,317

[22] Filed: Apr. 4, 1991

[30] Foreign Application Priority Data

Apr. 7, 1990 [JP] Japan .................................. 2-91358

[51] Int. Cl.⁵ .............................................. C08B 5/18
[52] U.S. Cl. ...................................... 106/2; 106/271;
106/285; 106/287.23
[58] Field of Search .................... 106/2, 796; 524/43;
8/115.6

[56] References Cited
U.S. PATENT DOCUMENTS 3,852,090  11/1974  Leonard et al. ...................... 8/115.6
4,253,999   3/1981  Okishi .................................... 106/2

FOREIGN PATENT DOCUMENTS 0216297  9/1986  European Pat. Off. .............. 524/43

OTHER PUBLICATIONS

Kuroda et al, Water Repellant Composition, Pat# 4,741,773, May 3, 1988.

Primary Examiner—William R. Dixon, Jr.
Assistant Examiner—Margaret V. Einsmann
Attorney, Agent, or Firm—Malcolm B. Wittenberg

[57] ABSTRACT

A composition having excellent water-repellent properties and stability in an emulsified state is provided. The composition contains a wax having a melting point of 50° to 90° C., a hydrocarbon resin, an alkali metal salt of a condensation product of β-naphthalene sulfonic acid with formalin and an alkali salt of polyacrylic acid. These components are emulsified in water. The composition is especially useful as a waterproof agent fo gypsum boards and gypsum plaster.

21 Claims, No Drawings

WATER-REPELLENT COMPOSITION

BACKGROUND OF THE INVENTION

The present invention relates to a novel water-repellent composition, and particularly to a water-repellent composition having excellent water resistant properties and improved handling properties.

Although conventional gypsum boards have excellent characteristics such as high fire resistant properties, high sound-proof properties, and low price, such boards have a disadvantage in that the water resistant properties are rather poor, and thus its application is limited. To provide gypsum with water-repellent properties, an aqueous emulsion of, for instance paraffin waxes, petroleum resins, or higher fatty acids, has been used, and especially paraffin waxes are often used because of excellent water-repellent properties and low price. However, as a large amount of surfactant must be added to emulsify paraffin waxes, the surfactant remains in gypsum boards in a great amount, which deteriorates their water-repellent properties.

In order to overcome such a defect, it is proposed to use, as a water-repellent agent, for instance a composition containing paraffins and oxidized paraffins (Japanese Patent Publication No. 55-50906), a composition containing waxes and waxes containing carboxyl groups (Japanese Laid-open Patent Application No. 55-37423), and a composition containing waxes and a monoester of styrene/maleic anhydride copolymer (Japanese Patent Publication No. 58-58304).

These water-repellent compositions, however, can not exhibit their characteristics to full extent unless such compositions are added in large amounts and have insufficient mechanical stability and storage stability. Additionally, a slurry of gypsum becomes unstable.

SUMMARY OF THE INVENTION

An object of the present invention is to provide a water-repellent composition having excellent water-repellent properties and stability in an emulsified state.

The above and other objects of the invention will become apparent from the following description.

In accordance with the present invention, there is provided a water-repellent composition comprising, as essential components, (a) a wax having a melting point of from 50° to 90° C., (b) a hydrocarbon resin, (c) an alkali metal salt of a condensation product of β-naphthalene sulfonic acid with formalin, and (d) an alkali salt of polyacrylic acid, the components (a) to (d) being emulsified in water.

PREFERRED EMBODIMENTS OF THE INVENTION

The present invention will be described in detail hereunder.

The component (a), which is used as one of the essential components of the present invention, is waxes having a melting point in a range from 50° to 90° C., and preferably in a range from 50° to 85° C. If the melting point of the component (a) is less than 50° C., it is in a liquid state at room temperature, and can not serve as a coating, whereas if the melting point is more than 90° C., problems relating to the handling properties occur when emulsified in water.

As a wax having a melting point in a range from 50° to 90° C., for instance a hydrocarbon wax or an oxygen-containing wax, or a mixture of these waxes may be used.

As the hydrocarbon wax, generally a petroleum fraction wax, a synthetic wax, or a natural wax with a melting point in the above-described range may be used. The aforementioned petroleum fraction waxes include an unrefined paraffin wax and an unrefined microcrystalline wax which are separated, by means of an appropriate dewaxing method, from a vacuum distillate, a vacuum distillation residual oil, or a heavy distillate, for instance, a slack wax or a scale wax. The petroleum fraction waxes also include those refined and/or decolorized from these unrefined petroleum waxes through appropriate processing such as processing with solvents, sweating treatment, washing with alkali solutions, clay treatment, or hydrogenation. Alternatively, the aforementioned synthetic waxes include, for instance polyolefin waxes such as waxes obtained through homopolymerization or copolymerization of olefins such as ethylene or propylene, waxes obtained through thermal decomposition of high polymer plastics or rubber-like polyolefins, or waxes which are obtained as by-products when producing high polymer plastic polyolefins; and a Fischer-Tropusch wax which is obtained as by-products when producing synthetic hydrocarbons by means of the Fischer-Tropusch method. The natural waxes include, for instance ozocerite or ceresine. In the present invention, any of these waxes, or a mixture of two or more of the waxes may be used as the aforementioned component (a).

The aforementioned oxygen-containing waxes include a carnauba wax, a montan wax, a rice bran wax, a bees wax, and a wood wax, all of which are natural waxes, an oxidized microcrystalline wax and oxidized paraffin which are synthetic waxes and modified secondary products thereof obtained through various reactions, polycarboxylic acid modified waxes obtained through addition reaction between the hydrocarbon wax and an unsaturated polycarboxylic acid and/or an anhydride thereof, or mixtures thereof. Also, preferably an oxygen-containing wax obtained by reacting 3 to 25 parts by weight of the unsaturated polycarboxylic acid and/or an anhydride thereof with 100 parts by weight of the hydrocarbon wax with a melting point from 50° to 90° C. may be used as the aforementioned oxygen-containing wax. In order to produce the oxygen-containing wax, the method disclosed in Japanese Laid-open Patent Application No. 49-96094 may be employed. Furthermore, preferably as the aforementioned oxygen-containing wax, there may be used an oxygen containing wax obtained by mixing 10 to 80 parts by weight, preferably 30 to 70 parts by weight of the petroleum fraction wax having a melting point from 50° to 85° C. with 20 to 90 parts by weight, preferably 30 to 70 parts by weight of the polyolefin wax having a melting point from 36 to 120° C. and a number average molecular weight from 310 to 1,000 with a number of double bonds from 5 to 50 per thousand carbon atoms to thereby obtain a mixture and then reacting 3 to 25 parts by weight, preferably 8 to 18 parts by weight of the unsaturated polycarboxylic acid and/or an anhydride thereof with 100 parts by weight of the mixture under radical generating conditions. The specific method has been disclosed in Japanese Laid-open Patent Application No. 54-81306. A melting point of the petroleum fraction wax used in this process is in a range from 50° to 85° C., preferably in a range from 50° to 70° C., and specifically, for instance a paraffin wax, a microcrystalline wax, or an unrefined paraffin wax such as, for instance a slack wax or a scale wax may be used. Also, as the aforementioned polyolefin wax, polyethylene, polypropylene, an olefin copolymer containing ethylene or propelene units may be used, and the polyethylene is especially preferable for this purpose. Preferably these polyolefin waxes may have a melting point from 36° C. to 120° C., preferably 36° to 90° C., and a number average molecular weight from 310 to 1,000, preferably 310 to 600 with a number of double bonds per thousand carbon atoms in a range from 5 to 50, preferably in a range from 10 to 45. The aforementioned radical generating conditions mean those under which for instance 0.2 to 5 parts by weight of an organic peroxide are added to 100 parts by weight of a wax mixture. As the organic peroxide, di-tert-butylperoxide, tert-butylhydroperoxide, dicumylperoxide, tert-butylcumylperoxide, cumylhydroperoxide, 2,5-dimethyl-2,5-(di-tert-butylperoxy)hexane, 2,5-dimethyl-2,5-di(tert-butylperoxy)hexene-3, methylethyl ketone peroxide, or mixtures thereof may be used, and especially di-tert-butylperoxide may preferably be used for this purpose. Also, as the aforementioned unsaturated polycarboxylic acid or its anhydride, maleic acid, itaconic acid, or citraconic acid may be used, and especially maleic acid may preferably be used for this purpose.

While the conditions for the reaction between the aforementioned specific petroleum fraction wax and the specific polyolefin wax are not particularly limited, it is preferred that the reaction be carried out at a reaction temperature from 120° to 220° C., preferably from 140° to 180° C., for a time period of 0.5 to 6.0 hours, preferably 1 to 3 hours.

As the oxygen-containing wax, an alkali metal salt such as for instance lithium, sodium, or potassium, of each wax may be used. An oxygen content in the oxygen-containing wax mentioned above may be preferably not less than 3.0% by weight, most preferably not less than 5.0% by weight. It is noted that the aforementioned oxygen content is a value by means of improved Vnterzeucher method (heat conductivity method), and details of this measuring method is disclosed in, for instance, Mikrochimica Acta, 1968 811. Robert Clumo.

As the aforementioned component (a) used in the present invention, either a hydrocarbon wax or an oxygen-containing wax, or mixtures thereof may be used, the mixtures being preferable. When mixtures are used, it is preferable that 150 parts by weight or less of the oxygen-containing wax be mixed with 100 parts by weight of the hydrocarbon wax.

The component (b) which is used as an essential component according to the present invention is a hydrocarbon resin, and includes for instance a petroleum resin with a molecular weight in a range from 500 to 3,000 obtained by polymerizing an aromatic petroleum fraction and/or a coal fraction with a boiling point from 140° to 240° C. with or without phenols such as phenol, catechol, resorcinol or hydroquinone in the presence of a Friedel Crafts type catalyst; a cumarone-indene resin with a molecular weight in a range from 500 to 3,000 by polymerizing tar-based naphtha in a similar way; a cyclopentadiene resin obtained by polymerizing a five member cyclic compound having a conjugated double bond represented by the following formula (1);

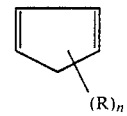

(1)

wherein R is an alkyl group having 1 to 3 carbon atoms, and n is an integer from 0 to 6, and/or a Diels-Alder addition product thereof or by copolymerizing 100 parts by weight of the aforementioned five member cyclic compound and/or the Diels-Alder addition product thereof with 2 to 200 parts by weight of at least one compound selected from monophenol, polyphenol and an alkyl substituent thereof; a terpene resin with a molecular weight in a range from 500 to 3,000 obtained from terpene oil; rosin; oligomers of vinyl hydrocarbons, such as ethylene, propylene, butene, isobutylene, or styrene, having a molecular weight in a range from 500 to 3,000 and a melting point of not less than 95° C.; and asphalt. Also, an addition product obtained by adding unsaturated carboxylic acid to the hydrocarbon resin or an ester of the aforementioned addition product obtained by reacting monohydric or polyhydric alcohol may be used. As the unsaturated carboxylic acid used for modification of the aforementioned hydrocarbon resin, for instance, $\alpha, \beta$-unsaturated polybasic acid such as maleic acid, maleic anhydride, fumaric acid, itaconic acid, citraconic acid, or mesaconic acid as well as unsaturated monocarboxylic acid such as acrylic acid, methacrylic acid, or crotonic acid may be mentioned. The aforementioned addition product may be obtained by mixing one or more unsaturated carboxylic acids with the aforementioned hydrocarbon resin and reacting with each other at a temperature of, for instance 180° to 220° C. As alcohol used for esterification, particularly monohydric alcohol such as methanol, ethanol, propanol, octanol, decanol or octadecanol, dihydric alcohol such as ethylene glycol, propylene glycol or butylene glycol, and polyhydric alcohol such as glycerol, pentaerythritol, or trimethylolpropane may be used. The aforementioned esterification reaction may be performed generally by heating the unsaturated acid addition product and alcohol at a temperature from 100° to 250° C.

As the aforementioned hydrocarbon resin, a petroleum resin, a Diels-Alder resin, and an addition product thereof with unsaturated acid added thereto may be most preferably used. Incidentally, the aromatic petroleum fraction used for preparing the petroleum resin, which is one of the hydrocarbon resins, is a cracked distillate with a boiling point from 140° to 240° C. obtained by cracking, for instance steam cracking, petroleum fractions such as naphtha, kerosene or light oil, and generally followed by polymerization and purification by decomposing catalysts with alkali, and then decomposing and removing unreacted oil and oligomers.

The component (c) used as an essential component in the present invention is an alkali metal salt of a condensation product of $\beta$-naphthalene sulfonic acid with formalin. The naphthalene ring may be unsubstituted or substituted with an alkyl group. Preferably the alkyl group may have 1 to 5 carbon atoms, and particularly a group having a straight chain or a branched chain such as a methyl group, an ethyl group, a propyl group, a butyl group, or pentyl group. As the alkali metal, lithium, sodium, or potassium may be exemplified. It is needless to say that a mixture of two or more having different structures may be used.

In this invention, the component (c) is a component which functions as an emulsifying agent, and if the component (c) is not used and other emulsifying agents are used, stability of the composition in an emulsified state and dispersibility of gypsum become worse, which is not preferred.

The component (d) which is used as an essential component according to the present invention is an alkali salt of polyacrylic acid. The polyacrylic acid may have an average molecular weight in a range from 500 to 10,000, and particularly 1,000 to 2,000. The acrylic acid herein meant includes methacrylic acid, so that the polyacrylic acid includes a homopolymer of acrylic acid, a homopolymer of methacrylic acid, a copolymer of acrylic and methacrylic acids or mixtures thereof. As the alkali metal, lithium, sodium, or potassium may be used. It is preferred that the neutralization percentage be in a range from 50% to 100%.

In this invention, to further improve the excellent properties, a water soluble alkali compound may be added to the aforementioned essential components (a) to (d). As the water soluble alkali compound, specifically an alkali metal hydroxide such as lithium hydroxide, sodium hydroxide, or potassium hydroxide; an alkali metal carbonate such as sodium carbonate or potassium carbonate; ammonia; ammonium hydroxide; amines such as dimethyl amine, trimethyl amine, or triethyl amine; and ethanol amines such as triethanol amine, diethanol amine, dimethyl ethanol amine, or methyl diethanol amine may be enumerated.

In this invention, the content of each of the aforementioned components is not specifically limited, but it is preferred that a weight ratio between the sum of the component (a) and the component (b) and the sum of the component (c) and the component (d) be 1:0.01–0.2, and preferably 1:0.05–0.15. Also, it is preferred that a weight ratio between the component (a) and the component (b) be 1:0.1–2, preferably 1:0.1–1, and a weight ratio between the component (c) and the component (d) be 1:0.1–1, preferably 1:0.5–1. If the component (e) is further added, a weight ratio between the sum of the components (a),(b),(c) and (d) and the component (e) may preferably be 1:0.01–0.1.

In a water-repellent composition according to the present invention, other additives may be added if necessary to further improve the properties. As the additives, an antioxidant, an ultraviolet absorbent, a wax dispersant, and a thickener may be mentioned. A mixing ratio of these additives to the sum of the components (a) to (d) or the sum of the components (a) to (e) may preferably be 1% by weight or less.

The water-repellent composition according to the present invention may be obtained by emulsifying the aforementioned components (a) to (d) and (e), if necessary, as well as other components in water. Although a quantity of water required for emulsifying these components is not limited, generally 0.8 to 10 times, and preferably 0.8 to 5 times by weight of water relative to the sum of the components may be added.

An arbitrary manufacturing method may be used to produce the water-repellent composition according to the present invention, and representative methods include a mechanical emulsification method and a phase inversion emulsification method. These methods may be employed either independently or simultaneously. In a case of mechanical emulsification method, for instance a homomixer, a homogenizer, a colloid mill, or a supersonic wave method may be used. The present invention is, however, not restricted in its manufacturing method, and any manufacturing method may be applicable as far as a homogeneous composition is obtained. Also, while the temperature for emulsification is not strictly critical, there is required a high temperature area wherein no solid is separated and the viscosity is moderately low, and generally the temperature area is in a range from 80° to 120° °C., preferably 85° to 95° C.

As a water-repellent composition produced according to the present invention has excellent stability in an emulsified state as well as excellent water-repellent properties, the water-repellent composition is especially useful when employed as a waterproof agent for gypsum boards and gypsum plaster, as well as a waterproof agent for cements, paper, and fibers.

EXAMPLES OF THE INVENTION

The present invention will be explained in more detail by referring to Examples and Comparative Examples. However, the present invention is not limited by these Examples and Comparative Examples in any way.

EXAMPLE 1

170 parts by weight of paraffin wax with a melting point of 59.8° C., 50 parts by weight of an oxygen-containing wax with a melting point of 61.1° C. and an oxygen value of 90, and 150 parts by weight of a synthetic hydrocarbon resin with a softening point of 95° C. and a bromine value of 20 were mixed and melted at a temperature of 120° C. Then, after an aqueous solution in which 4.5 parts by weight of potassium hydroxide was dissolved was added, 20 parts by weight of a condensation product of sodium β-naphthalene sulfonate with formalin and 10 parts by weight of poly (sodium acrylate) were added and dispersed homogeneously. 600 parts by weight of hot water was added to the dispersion and preliminarily emulsified. Then, the thus obtained emulsion was passed under pressure of 300 Kg/cm$^2$ applied by a piston type high pressure emulsifier, and an emulsion having a concentration of 40% by weight was obtained.

EXAMPLE 2

170 parts by weight of paraffin wax with a melting point of 54.3° C., 50 parts by weight of an oxygen-containing wax with a melting point of 61.1° C. and an acid value of 90, and 150 parts by weight of a synthetic hydrocarbon resin with a softening point of 100° C., a bromine value of 90, and a hydroxyl value of 70 were mixed and melted at a temperature of 120° C. Then, after an aqueous solution in which 4.5 parts by weight of potassium hydroxide was dissolved was added, 20 parts by weight of a condensation product of sodium β-naphthalene sulfonate with formalin and 10 parts by weight of poly (sodium acrylate) were added and dispersed homogeneously. 600 parts by weight of hot water was added and preliminarily emulsified. The emulsion was then passed under pressure of 300 Kg/cm$^2$ applied by a piston type high pressure emulsifier, whereby an emulsion having a concentration of 40% by weight was obtained.

EXAMPLE 3

230 parts by weight of paraffin wax with a melting point of 59.8° C. and 150 parts by weight of a synthetic hydrocarbon resin with a softening point of 95° C. and a bromine value of 20 were mixed and melted at a temperature of 120° C. Then, 13.3 parts by weight of a condensation product of sodium β-naphthalene sulfonate with formalin and 6.7 parts by weight of poly (sodium acrylate) were added and dispersed homogeneously. Then, after 600 parts by weight of hot water was added to the thus obtained dispersion and preliminarily emulsified, the emulsion was passed under pressure of 300 Kg/cm² applied by a piston type high pressure emulsifier, and an emulsion with a concentration of 40% by weight was obtained.

COMPARATIVE EXAMPLE 1

280 parts by weight of paraffin wax with a melting point of 59.8° C. and 100 parts by weight of an oxygen-containing wax with a melting point of 61.1° C. and an acid value of 90 were mixed and melted at a temperature of 100° C. Then, after an aqueous solution in which 9 parts by weight of potassium hydroxide was dissolved was added, 20 parts by weight of a condensation product of sodium β-naphthalene sulfonate with formalin was added and dispersed homogeneously. After 600 parts by weight of hot water was added to the thus obtained dispersion and preliminarily emulsified, the emusion was passed under pressure of 300 Kg/cm² applied by a piston type high pressure emulsifier, and an emulsion with a concentration of 40% by weight was obtained.

COMPARATIVE EXAMPLE 2

180 parts by weight of paraffin wax with a melting point of 59.8° C., 100 parts by weight of an oxygen-containing wax with a melting point of 61.1° C. and an acid value of 90, and 10 parts by weight of a hydrocarbon resin with a softening point of 95° C. and a bromine value of 20 were mixed and melted at a temperature of 120° C. Then, after an aqueous solution in which 9 parts by weight of potassium hydroxide was dissolved was added, 20 parts by weight of a condensation product of sodium β-naphthalene sulfonate with formalin was added and dispersed homogeneously. After 600 parts by weight of hot water was added to the thus obtained dispersion and preliminarily emulsified, the emulsion was passed under pressure of 300 Kg/cm² applied by a piston type high pressure emulsifier, and an emulsion with 40 weight % concentration was obtained.

COMPARATIVE EXAMPLE 3

320 parts by weight of paraffin wax with a melting point of 59.8° C. and 50 parts by weigh of an oxygen-containing wax with a melting point of 61.1° C. and an acid value of 90 were mixed and melted at a temperature of 100° C. After an aqueous solution in which 4.5 parts by weight of potassium hydroxide was dissolved was added, 20 parts by weight of sodium β-naphthalene sulfonate and 10 parts by weight of poly (sodium acrylate) were added and dispersed homogeneously. After 600 parts by weight of hot water was added to the thus obtained dispersion and preliminarily emulsified, the emulsion was passed under pressure of 300 Kg/cm² applied by a piston type high pressure emulsifier, and an emulsion with 40 weight % concentration was obtained.

Each of the emulsions obtained according to the above Examples and Comparative Examples was mixed with gypsum and kneaded, and the following test was performed to check water absorbing properties of the gypsum.

| Test material | β-type hemihydrate gypsum |
|---|---|
| Mixed amount of water | 75% |
| Added amount of testing emulsion | 1.5%, 2.5% (solid content) |
| Test piece size | 20 × 20 × 80 mm |
| Drying method | Dried for 30 minutes at 150° C. after being demolded and then drying for 24 hours at 50° C. |
| Absorption percentage (%) = (B − A)/A × 100 | |

A: Weight of a test piece before testing
B: Weight of a test piece after immersed for a predetermined time period in water having a temperature of 23° C.

The absorption percentages (%) thus obtained after immersed in water for 2.4 and 8 hours are as shown in Table 1.

TABLE 1

| Added Amount of Emulsion (%) | Time Period (hr.) | Absorption Percentage (%) | | | | | |
|---|---|---|---|---|---|---|---|
| | | Ex. 1 | Ex. 2 | Ex. 3 | Comp. Ex. 1 | Comp. Ex. 2 | Comp. Ex. 3 |
| 1.5 | 2 | 1.3 | 2.3 | 1.8 | 25.3 | 7.8 | 16.5 |
| | 4 | 2.7 | 4.0 | 3.2 | 28.6 | 9.1 | 22.4 |
| | 8 | 6.0 | 7.6 | 7.5 | 39.5 | 15.4 | 27.2 |
| 2.5 | 2 | 0.7 | 0.7 | 1.0 | 22.0 | 2.5 | 6.3 |
| | 4 | 0.7 | 0.8 | 1.0 | 27.6 | 5.4 | 11.5 |
| | 8 | 0.8 | 1.0 | 1.1 | 30.1 | 7.3 | 16.5 |

As clearly shown in Table 1, the compositions according to the present invention showed far better results in the water absorption test than those of the Comparative Examples, and have turned out to be useful when used as a waterproof agent. Although the present invention has been described with reference to the specific examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A water-repellent composition comprising, as essential components, (a) a wax having a melting point of from 50° to 90° C., (b) a hydrocarbon resin, (c) an alkali metal salt of a condensation product of β-naphthalene sulfonic acid with formalin, and (d) an alkali salt of polyacrylic acid, said components (a) to (d) being emulsified in water.

2. The composition according to claim 1, wherein said wax is selected from the group consisting of hydrocarbon waxes, oxygen-containing waxes and mixtures thereof.

3. The composition according to claim 2, wherein said hydrocarbon wax is selected from the group consisting of petroleum fraction waxes, synthetic waxes, natural waxes and mixtures thereof.

4. The composition according to claim 3, wherein said petroleum fraction wax is selected from the group consisting of paraffin waxes, microcrystalline waxes, refined paraffin waxes, refined microcrystalline waxes and mixtures thereof.

5. The composition according to claim 3, wherein said synthetic wax is selected from the group consisting of polyolefin waxes, Fisher-Tropusch waxes obtained as by-products when producing synthetic hydrocarbons by means of the Fischer-Tropusch method and mixtures thereof.

6. The composition according to claim 3, wherein said natural wax is selected from the group consisting of ozocerite, ceresine, and mixtures thereof.

7. The composition according to claim 2, wherein said oxygen-containing wax is selected from the group consisting of carnauba waxes, montan waxes, rice bran waxes, bees waxes, wood waxes, oxidized microcrystalline waxes, oxidized paraffin, polycarboxylic acid modified waxes, and mixtures thereof.

8. The composition according to claim 7, wherein said polycarboxylic acid modified wax is obtained by reacting 3 to 25 parts by weight of an acid selected from the group consisting of an unsaturated polycarboxylic acid, an anhydride thereof and mixtures thereof with 100 parts by weight of the hydrocarbon wax having a melting point of from 50° to 90° C.

9. The composition according to claim 7, wherein said polycarboxylic acid modified wax is obtained by mixing 10 to 80 parts by weight of a petroleum fraction wax with a melting point of from 50° to 85° C. with 20 to 90 parts by weight of a polyolefin wax with a melting point of from 36° to 120° C., a number average molecular weight in a range from 310 to 1,000, and a number of double bonds in a range from 5 to 50 per thousand carbon atoms to give a mixture and reacting 3 to 35 parts by weight of an acid selected from the group consisting of an unsaturated polycarboxylic acid, an anhydride thereof and mixtures thereof with 100 parts by weight of said mixture.

10. The composition according to claim 2, wherein up to 150 parts by weight of said oxygen-containing wax is mixed with 100 parts by weight of said hydrocarbon wax.

11. The composition according to claim 1, wherein said hydrocarbon resin is selected from the group consisting of a petroleum resin with a molecular weight in a range from 500 to 3,000, a cumarone-indene resin with a molecular weight in a range from 500 to 3,000, a cyclopentadiene resin, a terpene resin with a molecular weight in a range from 500 to 3,000, rosin, oligomers of vinyl hydrocarbons with a molecular weight in a range from 500 to 3,000 and a melting point of not less than 95° C., asphalt, a hydrocarbon resin with unsaturated carboxylic acid added thereto, and an esterification product of the hydrocarbon resin with unsaturated carboxylic acid added thereto, and mixtures thereof.

12. The composition according to claim 1, wherein the alkali metal of said component (c) is selected from the group consisting of sodium, potassium, and lithium, 13. The composition according to claim 1, wherein said polyacrylic acid is selected from the group consisting of a homopolymer of acrylic acid, a homopolymer of methacrylic acid, a copolymer of acrylic acid and methacrylic acid and mixtures thereof.

14. The composition according to claim 1, wherein the alkali metal of said component (d) is selected from the group consisting of sodium, potassium, and lithium.

15. The composition according to claim 1 further comprising a water-soluble alkali compound (e).

16. The composition according to claim 15, wherein said water-soluble alkali compound is selected from the group consisting of an alkali metal hydroxide, alkali metal carbonate, ammonia, ammonium hydroxide, amines, ethanol amines and mixtures thereof.

17. The composition according to claim 1, wherein a weight ratio between a sum of the component (a) and the component (b) and a sum of the component (c) and the component (d) is 1:0.01–0.2.

18. The composition according to claim 1, wherein a weight ratio between the component (a) and the component (b) is 1:0.1–2 and a weight ratio between the component (c) and the component (d) is 1:0.01–1.

19. The composition according to claim 15, wherein a weight ratio between a sum of the components (a), (b), (c) and (d) and the component (e) is 1:0.01–0.1.

20. The composition according to claim 1, wherein the components (a) to (d) are emulsified in 0.8 to 10 times by weight of water.

21. The composition according to 15, wherein the components (a) to (e) are emulsified in 0.8 to 10 times by weight of water.

* * * * *